3,027,373
NEW VAT DYES
Andrew Stephen Tomcufcik and William Baptist Hardy, Bound Brook, N.J., assignors to American Cyanamid Company, New York, N.Y., a corporation of Maine
No Drawing. Filed June 8, 1953, Ser. No. 360,321
3 Claims. (Cl. 260—274)

This invention relates to new vat dyestuffs having the formula:

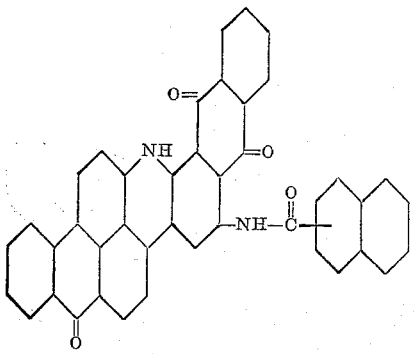

where the acyl group may be derived from either alpha- or beta-naphthoic acid.

The dyestuffs of the present invention are naphthoyl derivatives of 4-amino-Bzl'-(alphaanthraquinonylamnio)-benzanthrone-2,2'-acridine. To avoid repetition throughout the specification of awkward language, this ring structure will be referred to as aminobenzanthrone anthraquinone acridine.

Dyestuffs for the dyeing of military uniforms present a serious problem. The enormous increase in fire power in modern warfare makes it imperative for soldiers to blend into the terrain so that they are either unobserved or present relatively poor targets. The art of camouflage resulted in the development of uniforms having colors which blend into the average landscape. During the Second World War, observation by means of near infrared radiation completely changed the problem of camouflage because, while dyes of excellent fastness and dull drab shades under visible light were generally used for the dyeing of uniforms, all of the fast dyes with otherwise desirable properties showed high reflectance in the infrared and therefore soldiers wearing uniforms dyed with these dyes when observed under infrared radiation, for example by means of devices such as snooperscopes and sniperscopes, stood out against average terrain, making discovery easy and presenting excellent targets.

Extensive investigations have shown that to be effective under near infrared observation, dyed fabrics must show an infrared reflectance which is relatively low, preferably below 25%, but which of course should not be too low. In other words in average terrain, a soldier to be effectively concealed or to present a poor target should appear no lighter than the background and while it is undesirable that a soldier should appear much darker, any difference in infrared reflectance from that of the terrain should be on the darker rather than on the lighter side.

There are known some dyes, for example some sulfur dyes, which exhibit low infrared reflectance. These dyes, however, have such inferior fastness to light and to the rather drastic washing conditions in the field that they are not practical. On the other hand, vat dyes which shown satisfactory light and wash fastness have, in the past, also shown high infrared reflectance.

The dyestuffs of the present invention not only have desirable low infrared reflectance, but show good fastness properties, making them suitable for the dyeing of uniforms and other materials to be used for military purposes. It is not known why the naphthoylamino compounds of the present invention show superior fastness properties to the corresponding benzoyl compound and it is not desired to limit the present invention to any theory of why these improved properties result.

The dyestuffs of the present invention can be made easily by acylating the aminobenzanthrone anthraquinone acridine with acid halides or anhydrides of 1- or 2-naphthoic acids. The acylation proceeds easily and does not require any unusual reaction techniques. Preferably, the reaction is carried out in a suitably inert solvent, such as aromatic hydrocarbons and their halogen or mononitro derivatives. Where acid halides are used, hydrogen halide is set free in the reaction and it is desirable to include an acid-binding agent, such as pyridine or other heterocyclic basis, soda ash or the like.

The invention will be described in greater detail in conjunction with the following examples, the parts being by weight unless otherwise specified.

*Example 1*

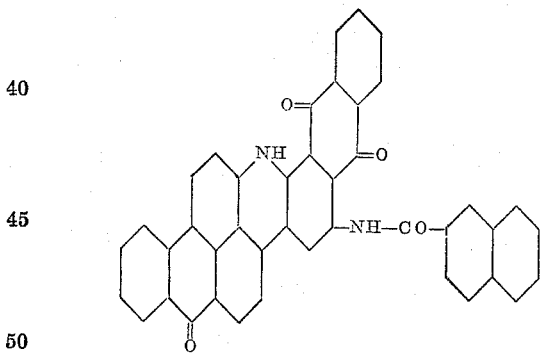

30 parts of 2-naphthoic acid are converted into the acid chloride and dissolved in 600 parts of nitrobenzene. To this solution are added 35 parts of 4-aminobenzanthrone anthraquinone acridine and 4 parts of pyridine. The mixture is stirred at 145–150° C. until the reaction is substantially complete. The mixture is cooled and diluted with 1,200 parts of alcohol, after which it is stirred until precipitation is complete. The crude product is filtered and purified by washing with alcohol, followed by boiling the cake in 500 parts of pyridine. The product is isolated by filtering and washing with alcohol. The dry product dyes cellulose fibers an olive shade of good fastness properties and low infrared reflectance.

Example 2

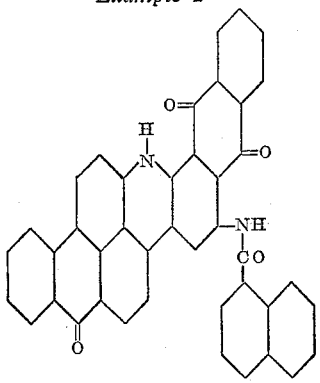

The procedure of Example 1 is followed, using 1-naphthoyl chloride rather than 2-naphthoyl chloride. The product is isolated by a similar procedure in 85% yield. It dyes cellulose fibers in olive shades somewhat yellower than the product of Example 1. The fastness properties and the infrared absorption are both good.

We claim:

1. Compounds of the structure:

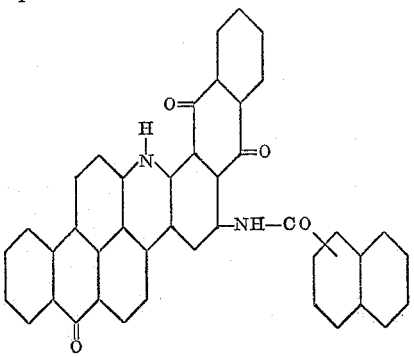

2. The compound of the structure:

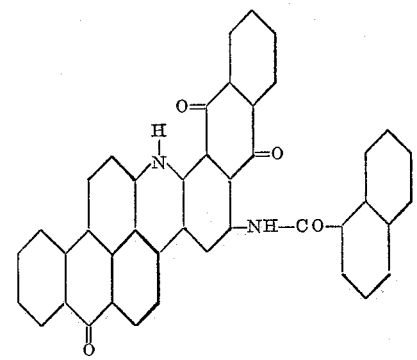

3. The compound of the structure:

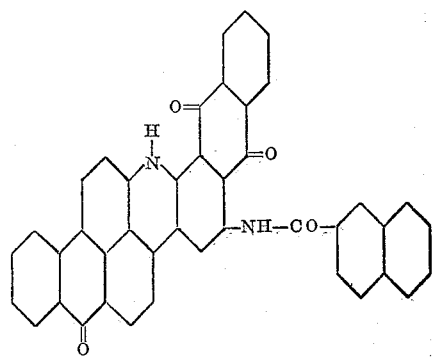

References Cited in the file of this patent
UNITED STATES PATENTS

| | | |
|---|---|---|
| 1,850,562 | Neresheimer et al. | Mar. 22, 1932 |
| 2,530,010 | Fiorini | Nov. 14, 1950 |